United States Patent

Osaka

[11] Patent Number: 5,793,570
[45] Date of Patent: Aug. 11, 1998

[54] MAGNETIC HEAD

[75] Inventor: Tomohiko Osaka, Yamagata, Japan

[73] Assignee: Mitsumi Electric Co., Ltd., Tokyo, Japan

[21] Appl. No.: 681,354

[22] Filed: Jul. 23, 1996

[30] Foreign Application Priority Data

Jul. 28, 1995 [JP] Japan ..................... 7-212463

[51] Int. Cl.$^6$ ............................. G11B 5/48; G11B 21/21
[52] U.S. Cl. ............................................ 360/104
[58] Field of Search ............................ 360/103, 104

[56] References Cited

FOREIGN PATENT DOCUMENTS 6-131738  5/1994  Japan .

*Primary Examiner*—Stuart S. Levy
*Assistant Examiner*—George J. Letscher
*Attorney, Agent, or Firm*—Whitham, Curtis & Whitham

[57] ABSTRACT

In a magnetic head in which a gap portion of a core is interposed between an opposed slider and a holding slider and a coil is set in a coil portion of the core, the opposed slider is made of a glass or ceramic material having excellent wear resistance and the holding slider is made of a resin material. The core has an end face thereof brought into contact with a magnetic disk. The opposed slider has a magnetic disk sliding surface that is opposed to a core of a counterpart magnetic head while interposing the magnetic disk between the magnetic disk sliding surface and the core of the counterpart magnetic head. The holding slider stabilizes the position of the core.

18 Claims, 3 Drawing Sheets

MAGNETIC HEAD

BACKGROUND OF THE INVENTION

1. Field of the Invention

The invention relates to a magnetic recording and reproducing apparatus using a magnetic disk as a recording medium. More particularly, the invention is directed to a data recording and reading magnetic head used for such magnetic recording and reproducing apparatus.

2. Related Art

As is known well, a 3.5" floppy disk drive records and reproduces data with respect to a magnetic disk using a magnetic head such as shown in FIGS. 5 and 6. That is, a coil 2 is set in a coil portion 1a of a core 1 that is made of a ferromagnetic material, and a magnetic path bar 3 for forming a magnetic path magnetically connects both ends of the coil portion 1a.

While an end face of a gap portion 1b of the core 1 having a nonmagnetic gap G formed therein is brought into contact with a surface of the magnetic disk D as shown in FIG. 6, the end face is interposed between a platelike opposed slider 4 having excellent wear resistance and a holding slider 5 in order to obtain stable output, and both the opposed slider 4 and the holding slider 5 are fixed to an end face of a shield ring 6 that shields the coil portion 1a and the coil 2 from external magnetic fields and the like. That is, at the time the magnetic head accesses the magnetic disk D, the magnetic head on the end face of the gap portion 1b of the core 1 is staggered by a predetermined distance in an accessing direction with respect to an end face of a gap portion of a counterpart magnetic head indicated by two dot chain lines in FIG. 6. To keep the end face of the gap portion of the counterpart magnetic head in contact, a magnetic disk sliding surface 4a that is opposed to the end face of the gap portion of the counterpart magnetic head is integrally formed on the corresponding surface of the opposed slider 4, and an air groove, i.e., a slider groove 7 is formed next to the magnetic disk sliding surface 4a.

In addition, the holding slider 5 that interposes the gap portion 1b of the core 1 between itself and the opposed slider 4 is provided to stabilize the condition in which the core 1 is supported by the shield ring 6 that serves as a fixing member.

The opposed slider 4 and the holding slider 5 are made of a ceramic material that is prepared by a sintering process to meet wear resistance requirements in conventional examples. However, both the opposed slider 4 and the holding slider 5 made of ceramic are heavy and require a complicated process because ceramic compacts must be formed and the formed parts must go through the sintering process in a sintering furnace. This elevates the parts cost of the opposed slider 4 and the holding slider 5, which in turn limits the possibility of reduction in the cost of manufacture of the magnetic head.

SUMMARY OF THE INVENTION

The invention has been made in view of the aforementioned cost-related problem encountered with the conventional magnetic head. The object of the invention is therefore to provide a magnetic head which is lightweight, which does not require a complicated fabrication process, and whose parts cost is low.

To achieve the above object, the invention is applied to a magnetic head that has a gap portion of a core interposed between an opposed slider and a holding slider and that allows a coil to be set in a coil portion of the core. The core has an end face thereof brought into contact with a magnetic disk. The opposed slider has a magnetic disk sliding surface to be opposed to a core of a counterpart magnetic head while interposing the magnetic disk between the magnetic disk sliding surface and the core of the counterpart magnetic head. The holding slider serves to stabilize a position of the core. In such a magnetic head, the opposed slider is made of a wear-resistant material, and the holding slider is made of a resin material.

DETAILED DESCRIPTION OF THE PREFERRED EMBODIMENTS

Embodiments of the invention will now be described in detail with reference to FIGS. 1 to 4.

Figure 1:
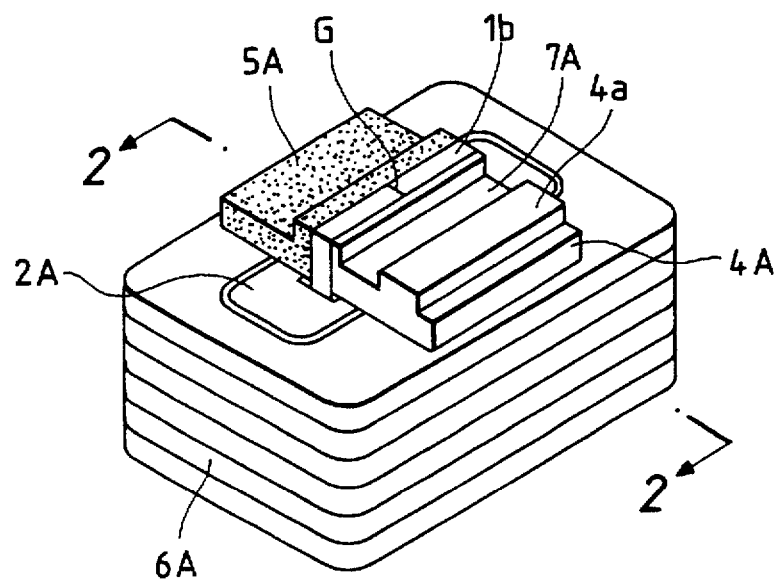
FIG. 1 is a perspective view showing the entire part of a magnetic head, which is a first embodiment of the invention.
Figure 2:
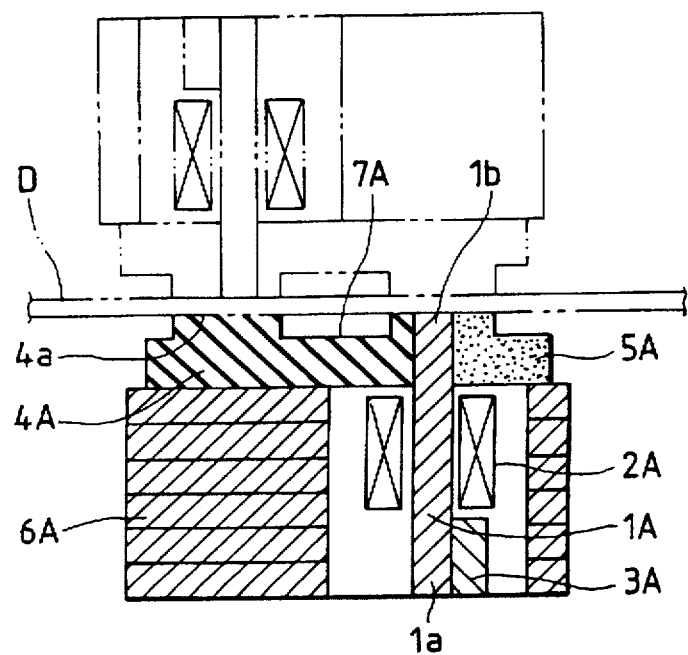
FIG. 2 is a sectional view of the magnetic head taken along a line 2—2 of FIG. 1.

FIGS. 1 and 2 show a magnetic head, which is a first embodiment of the invention. This magnetic head includes: a core 1A, a coil 2A that is set in a coil portion 1a of the core 1A; a magnetic path bar 3A; an opposed slider 4A; a holding slider 5A; and a shield ring 6A.

That is, as shown in FIG. 2, the end face of a gap portion 1b of the core 1A is brought into contact with a surface of a magnetic disk D. The gap portion 1b is interposed between the opposed slider 4A, which will be described later in detail, and the holding slider 5A. A magnetic disk sliding surface 4a of the opposed slider 4A confronts an end face of a counterpart gap portion of a magnetic head while interposing the magnetic disk D between the magnetic disk sliding surface 4a and the end face of the counterpart gap portion. An air groove, i.e., a slider groove 7A is formed in the surface of the opposed slider 4A next to the magnetic disk sliding surface 4a. The opposed slider 4A and the holding slider 5A are fixed to an end face of the shield ring 6A that shields both the coil portion 1a and the coil 2A from external magnetic fields and the like.

According to the invention, the opposed slider 4A is made of, e.g., glasses or wear-resistant ceramics such as $CaTiO_3$ and $BaTiO_3$, whereas the holding slider 5A is made of a resin material that permits mass production.

Constructed as described above, the magnetic head according to the first embodiment of the invention is lightweight and fabricated more efficiently and less expensively than the conventional magnetic head whose holding slider 5A is made of a ceramic material. That is, since the holding slider 5A is constructed of a part made of resin, a great number of holding sliders 5A can be formed using a single mold at the same time efficiently by injection molding. Therefore, the fabrication process for the magnetic head of the invention is simpler than that of the part made of ceramic, which in turn contributes to achieving a satisfactory reduction in the cost of manufacture by mass production. In fact, holding sliders 5A were fabricated at a cost about half the cost entailed by the conventional example according to a trial fabrication effected by the present applicant.

In addition, the assembled magnetic head is held stable because the coil 2A and the core 1A that are arranged inside the shield ring 6A are held stable with the gap portion 1b of the core 1A interposed between the opposed slider 4A and the holding slider 5A that are fixed to the end face of the shield ring 6A. At the time the magnetic head accesses the magnetic disk D, the magnetic disk D is interposed between the gap portion of the core of the counterpart magnetic head and the magnetic disk sliding surface 4a of the wear-resistant opposed slider 4A as shown in FIG. 2, and even if the contact surface of the holding slider 5A wears, the core 1A still remains held stable between the base portion of the holding slider 5A and the opposed slider 4A.

Figure 3:
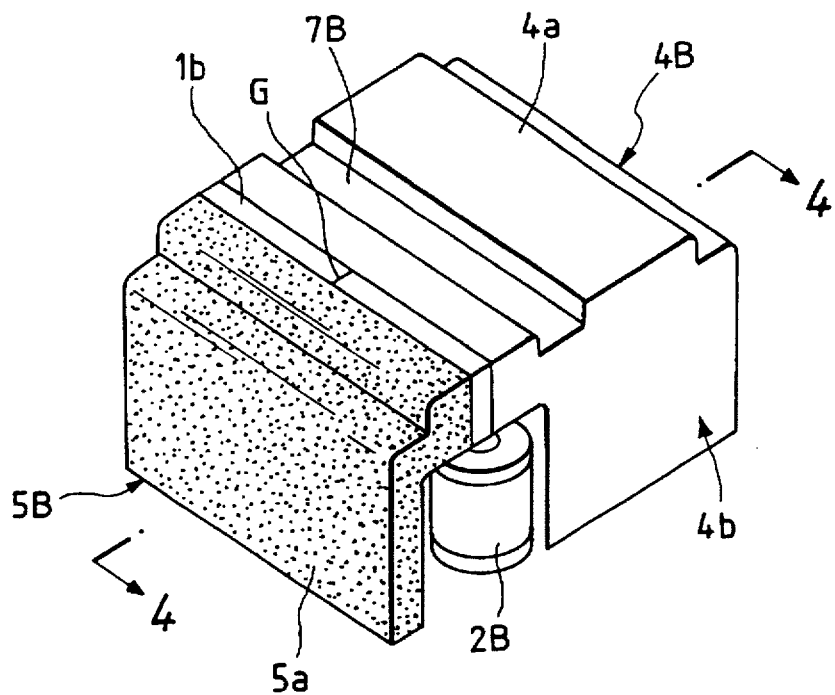
FIG. 3 is a perspective view showing the entire part of a magnetic head, which is a second embodiment of the invention.
Figure 4:
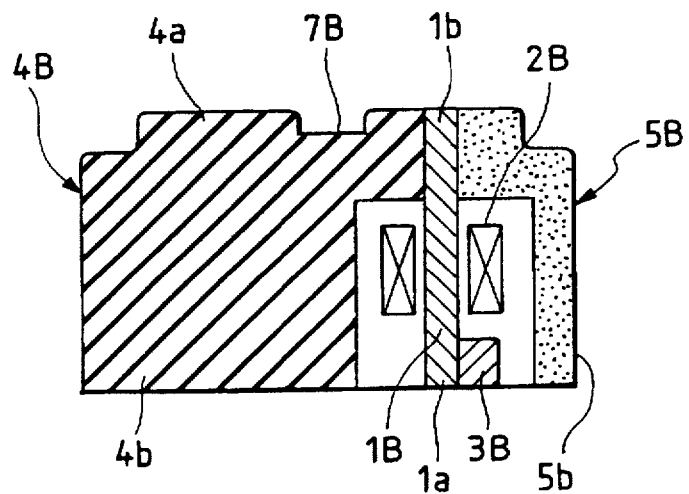
FIG. 4 is a sectional view of the magnetic head taken along a line 4—4 of FIG. 3.
Figure 5:
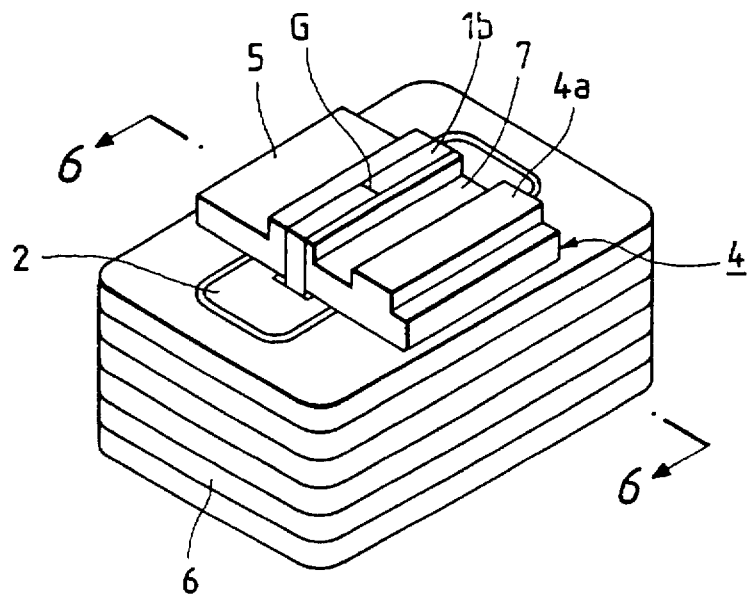
FIG. 5 is a perspective view showing the entire part of a conventional magnetic head.
Figure 6:
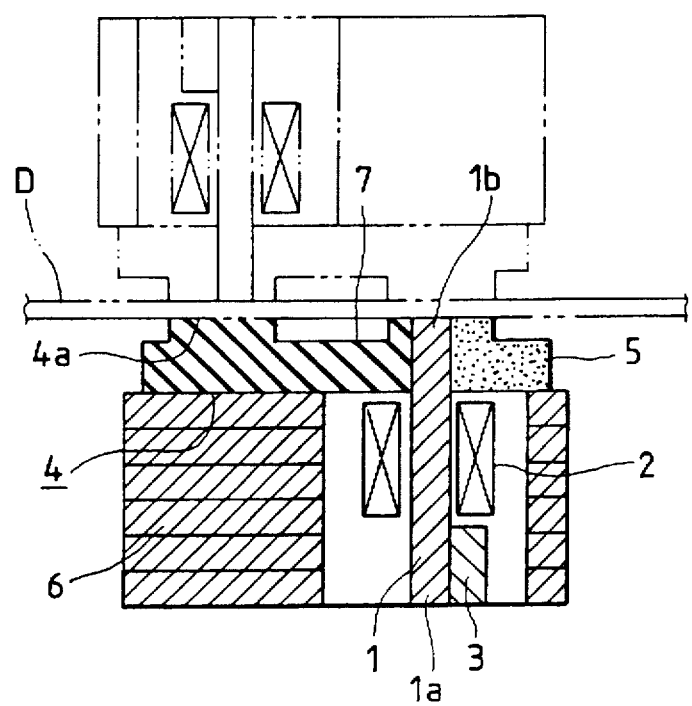
FIG. 6 is a sectional view of the mag head taken along a line 6—6 of FIG. 5.

FIGS. 3 and 4 show a magnetic head, which is a second embodiment of the invention. This magnetic head includes inverted L-shaped opposed slider 4B and holding slider 5B that have a coil portion 1a of a core 1B, a coil 2B, and skirt portions 4b, 5a that enclose a magnetic path bar 3B. That is, this opposed slider 4B has a magnetic disk sliding surface 4a, which is opposed to the gap portion of a counterpart magnetic head, integrally formed and has a slider groove 7B formed in a surface thereof. The opposed slider 4B is made of a glass or ceramic material. In addition, the holding slider 5B is fabricated by injection molding in a manner similar to that of the first embodiment and is made of a resin material that permits mass production.

Constructed as described above, the magnetic head according to the second embodiment can provide a structure in which the gap portion 1b of the core 1B can be held stable while interposed between the opposed slider 4B and the holding slider 5B independently of whether the contact surface of the holding slider 5B is worn or not.

As is apparent from the foregoing, the invention is characterized as making the holding slider of a resin material that permits mass production. Therefore, the invention can provide a lightweight magnetic head whose fabrication process is simplified and whose cost of manufacture is satisfactorily curtailed.

What is claimed is:

1. A magnetic head comprising:

a core having a gap portion for contacting a magnetic disk and a coil portion opposite said gap portion;

an opposed slider connected to said core and having a magnetic disk sliding surface opposed to a core of a counterpart magnetic head for interposing the magnetic disk between the magnetic disk sliding surface and the core of the counterpart magnetic head, the opposed slider consisting of one of a ceramic material and a glass material;

a holding slider connected to said core and for stablizing a position of the core, the holding slider consisting solely of a resin material, said gap portion being interposed between said opposed slider and said holding slider; and a coil surrounding said coil portion of the core, wherein said opposed slider limits wear on said holding slider such that even if a contact surface of said holding slider wears, said core remains held stable between said holding slider and said opposed slider.

2. A magnetic head as claimed in claim 1, wherein the opposed slider and the holding slider each have an L-shape.

3. The magnetic head as in claim 1, wherein said wear-resistant material comprises one of $CaTiO_3$ and $BaTiO_3$.

4. The magnetic head as in claim 1, wherein said holding slider comprises an injection-molded resin.

5. The magnetic head as in claim 1, further comprising a shield ring surrounding said core.

6. The magnetic head as in claim 5, wherein said opposed slider and said holding slider are connected to said shield ring.

7. The magnetic head as in claim 6, wherein said opposed slider and said holding slider maintain said core in a predetermined position.

8. The magnetic head as in claim 1, wherein said opposed slider and said holding slider each have an inverted L-shape, such that said opposed slider and said holding slider surround said core.

9. The magnetic head as in claim 1, wherein said opposed slider includes a slider groove.

10. A magnetic head structure for reading and writing to a storage medium, comprising:

a first magnetic head; and a second magnetic head opposing said first magnetic head, wherein said storage medium is positionable between said first magnetic head and said second magnetic head, wherein said first magnetic head and said second magnetic head each comprise:

a first slider;

a core positioned adjacent said first slider; and a second slider positioned adjacent said core, such that said core is positioned between said first slider and said second slider, said first slider of said first magnetic head being positioned opposite said core of said second magnetic head and said first slider of said second magnetic head being positioned opposite said core of said first magnetic head, said first slider consisting of one of a ceramic material and a glass material and said second slider consisting solely of resin, wherein said first slider limits wear on said second slider such that even if a contact surface of said second slider wears, said core remains held stable between said first slider and said second slider.

11. A magnetic head as in claim 10, wherein said first slider and said second slider each have an L-shape.

12. The magnetic head as in claim 10, wherein said wear-resistant material comprises one of $CaTiO3$ and $BaTiO3$.

13. The magnetic head as in claim 10, wherein said second slider comprises an injection-molded resin.

14. The magnetic head as in claim 10, further comprising a shield ring surrounding said core.

15. The magnetic head as in claim 14, wherein said first slider and said second slider are connected to said shield ring and said first slider and said second slider maintain said core in a predetermined position.

16. The magnetic head as in claim 10, wherein said first slider and said psecond slider each have an inverted L-shape, such that said first slider and said second slider surround said core.

17. The magnetic head as in claim 10, wherein said first slider comprises an opposed slider and said second slider comprises a holding slider.

18. The magnetic head as in claim 10, wherein said first slider includes a slider groove.

* * * * *